(12) United States Patent
Sivinski et al.

(10) Patent No.: US 12,677,725 B2
(45) Date of Patent: Jul. 14, 2026

(54) CIRCULAR BULK SEED DISTRIBUTOR MANIFOLD

(71) Applicant: Harvest International, Inc., Storm Lake, IA (US)

(72) Inventors: Jeffrey Alan Sivinski, Cherokee, IA (US); Byron James Friesen, Storm Lake, IA (US)

(73) Assignee: Harvest International, Inc., Storm Lake, IA (US)

( * ) Notice: Subject to any disclaimer, the term of this patent is extended or adjusted under 35 U.S.C. 154(b) by 185 days.

(21) Appl. No.: 18/410,518

(22) Filed: Jan. 11, 2024

(65) Prior Publication Data

US 2025/0228154 A1 Jul. 17, 2025

(51) Int. Cl.
| | |
|---|---|
| *A01C 7/08* | (2006.01) |
| *A01C 7/20* | (2006.01) |

(52) U.S. Cl.
CPC .............. *A01C 7/082* (2013.01); *A01C 7/206* (2013.01)

(58) Field of Classification Search
CPC ...................................... A01C 7/084
USPC ......................................... 111/175
See application file for complete search history.

(56) References Cited

U.S. PATENT DOCUMENTS

| | | | | |
|---|---|---|---|---|
| 3,554,607 | A | * | 1/1971 | Herman et al. ........ B65G 53/00 |
| | | | | 406/123 |
| 4,131,072 | A | | 12/1978 | Lingl, Jr. et al. |
| 4,215,824 | A | | 8/1980 | Weiste |
| 4,475,819 | A | | 10/1984 | Balmer |
| 4,480,794 | A | * | 11/1984 | Fuss ....................... A01C 7/084 |
| | | | | 239/689 |
| 4,815,414 | A | | 3/1989 | Duffy et al. |
| 4,874,130 | A | | 10/1989 | Wondergem |
| 4,913,344 | A | | 4/1990 | Bauer |
| 5,114,078 | A | | 5/1992 | Takata |
| 5,125,583 | A | | 6/1992 | Strand |
| 5,379,706 | A | | 1/1995 | Gage et al. |
| 6,116,284 | A | * | 9/2000 | Murray ................. A01C 15/04 |
| | | | | 406/87 |
| 6,688,244 | B1 | | 2/2004 | Meyer et al. |
| 7,025,010 | B2 | | 4/2006 | Martin et al. |
| 7,462,002 | B2 | | 12/2008 | Mayerle |
| 8,348,556 | B2 | | 1/2013 | Hilgraf et al. |
| 8,821,078 | B2 | | 9/2014 | Hockett et al. |
| 8,894,330 | B2 | | 11/2014 | Gluch et al. |

(Continued)

FOREIGN PATENT DOCUMENTS

| | | |
|---|---|---|
| EP | 1342400 A1 | 9/2003 |
| WO | 2012170690 A2 | 12/2012 |

*Primary Examiner* — Joseph A Dillon, Jr.
(74) *Attorney, Agent, or Firm* — McKee, Voorhees & Sease, PLC

(57) ABSTRACT

A circular seed distribution manifold delivers seed from a bulk tank to bins on row planter units. The manifold has a circular chamber formed by a plurality of modules joined side to side. The modules include outwardly radially extending tubular barbs connected to hoses extending to the bins. Pressurized air is introduced into the chamber through an opening in the floor of the manifold to create a fluidized bin or mixture with the seeds evenly distributed around the chamber. The air pressure carries the seeds out the barbs, through the hoses, and into the bins for planting. The barbs have an inlet flush with the perimeter wall of the manifold to minimize plugging.

27 Claims, 16 Drawing Sheets

(56) References Cited

U.S. PATENT DOCUMENTS

| | | | | |
|---|---|---|---|---|
| 8,955,445 | B2 * | 2/2015 | Riffel | A01C 7/084 340/684 |
| 9,781,875 | B2 * | 10/2017 | Riffel | A01C 7/084 |
| 10,773,904 | B2 | 9/2020 | Peterac et al. | |
| 10,779,460 | B2 * | 9/2020 | Pirkenseer | A01C 7/084 |
| 11,337,361 | B2 * | 5/2022 | Lanyon | A01C 7/084 |
| 11,606,897 | B2 | 3/2023 | Sivinski | |
| D1,072,001 | S * | 4/2025 | Sivinski | D15/28 |
| 2012/0312211 | A1 | 12/2012 | Hubalek et al. | |
| 2016/0157418 | A1 | 6/2016 | Henry | |
| 2017/0086350 | A1 * | 3/2017 | Borkgren | A01C 7/084 |
| 2020/0079636 | A1 | 3/2020 | Wrzbauer et al. | |
| 2021/0307238 | A1 | 10/2021 | Sivinski | |
| 2023/0371420 | A1 * | 11/2023 | Riffel | A01C 7/084 |
| 2024/0206371 | A1 * | 6/2024 | Troebner | A01C 7/084 |

* cited by examiner

CIRCULAR BULK SEED DISTRIBUTOR MANIFOLD

TECHNICAL FIELD

The invention is directed toward a seed distribution manifold for delivering seed from a bulk seed tank to bins on row planter units.

BACKGROUND

Crop seed planting is conventionally done using multiple row planters mounted on the toolbar pulled behind a tractor. Seed is pneumatically delivered from a large bulk seed hopper to the smaller seed bins on each of the row planter units for planting via a seed meter on each row unit. A seed plenum or distributor resides beneath the bulk seed hopper and is connected to a source of pressurized air which carries the seeds from the plenum through hoses to the seed bins on the row units. The seed distributor manifold is typically elongated, with a rectangular shape, with a plurality of tubes or nozzles extending along each side of the plenum to which the hoses are attached. One problem with the elongated distributor is uneven seed distribution, which causes unequal filling of the seed bins on the row units. This leads to the seed bins becoming empty at different times during the planting operation. This non-uniform emptying of the conventional elongated seed distributor manifold is undesirable, since the operator must stop the planting operation to manually redistribute and level seed in the distributor, which increases the planting time.

Therefore, there is a need for an improved bulk seed distributor which overcomes the problems of the prior art.

Accordingly, a primary objective of the present invention is the provision of a round bulk seed distributor manifold which provides uniform distribution of seed for even delivery to the seed bins on the row planters.

Still another objective of the present invention is the provision of a circular seed distributor manifold formed by a plurality of modules which form a circular chamber for receiving seed from the bulk seed tank and receiving pressurized air to create a pocket of turbulent air carrying the seed to discharge nozzles extending radially outwardly from the interconnected modules.

Another objective of the present invention is the provision of a circular seed distribution manifold having a fluidized air and seed mixture for conveying seed from the manifold to hoses connected to row unit planters.

A further objective of the present invention is the provision of a seed distribution manifold having an outer wall with seed tubes extending outwardly therefrom, and the inlet of the seed tube being flush with the wall to eliminate or minimize plugging of the inlet by seeds passing into the tube.

Another objective of the present invention is the provision of a seed distribution manifold which is easy to manufacture and assemble from a plurality of modules joining side-by-side to form a circular chamber.

Still another objective of the present invention is the provision of a seed distribution manifold having a circular chamber for receiving feed and air, which combine to form a fluidized bed evenly distributed about the chamber.

A further objective of the present invention is a provision of a bulk seed planter which optimizes seed planting and minimizes planting time.

Another objective of the present invention is the provision of a round bulk seed distributor manifold which eliminates the need for manually redistributing seed within the distributor.

Yet another objective of the present invention is the provision of a bulk seed distributor manifold having a floor which can be quickly and easily opened and closed for cleanout of the distributor.

A further objective of the present invention is the provision of a method of uniformly distributing seeds from a bulk seed hopper to seed bins on row planter units.

Still another objective of the present invention is a provision of a circular seed distributor manifold which provides consistent and even delivery of seeds to row planter seed bins.

Still another objective of the present invention is a provision of a method for pneumatically filling row planter seed bins using a circular seed distributor manifold.

These and other objectives become apparent from the following description of the invention.

SUMMARY

A circular seed distribution manifold is adapted to receive seed from a bulk seed tank and deliver or convey the seed through hoses to bins on row planter units. The manifold includes a plurality of modules, each having opposite first and second lateral sides and an outer perimeter wall segment extending between the opposite sides. Each module is closed on one of the lateral sides and open on the opposite lateral side, and substantially open on a rear side opposite the perimeter wall segment. A dividing wall creates a cavity within the module. The modules are connected together, side to side, to form a circular chamber to receive seed from the bulk seed tank. The chamber includes a floor assembly with one or more cleanout doors that can be moved from a normally closed position to an open position for cleaning the interior of the chamber. At least some of the modules have tubes or hose barbs extending radially outwardly from the perimeter wall, with each tubing connected to one of the hoses. Each tube has an inlet in the perimeter wall of the module, and communicates with the module cavity. An air inlet is provided in the bottom of the chamber to direct pressurized air into this chamber to create a fluidized or turbulent mixture of air and seeds within the module cavities, and carry the seeds to the tube inlets for conveying through the hoses to the row planter bins. An internal cone assembly within the chamber directs pressurized air and seed toward the seed tubes. The diameter of the chamber can be increased by adding more modules and decreased by deleting some modules. Some modules may be blanks, without seed tubes, for use with row planters having less units.

DETAILED DESCRIPTION

Figure 1:
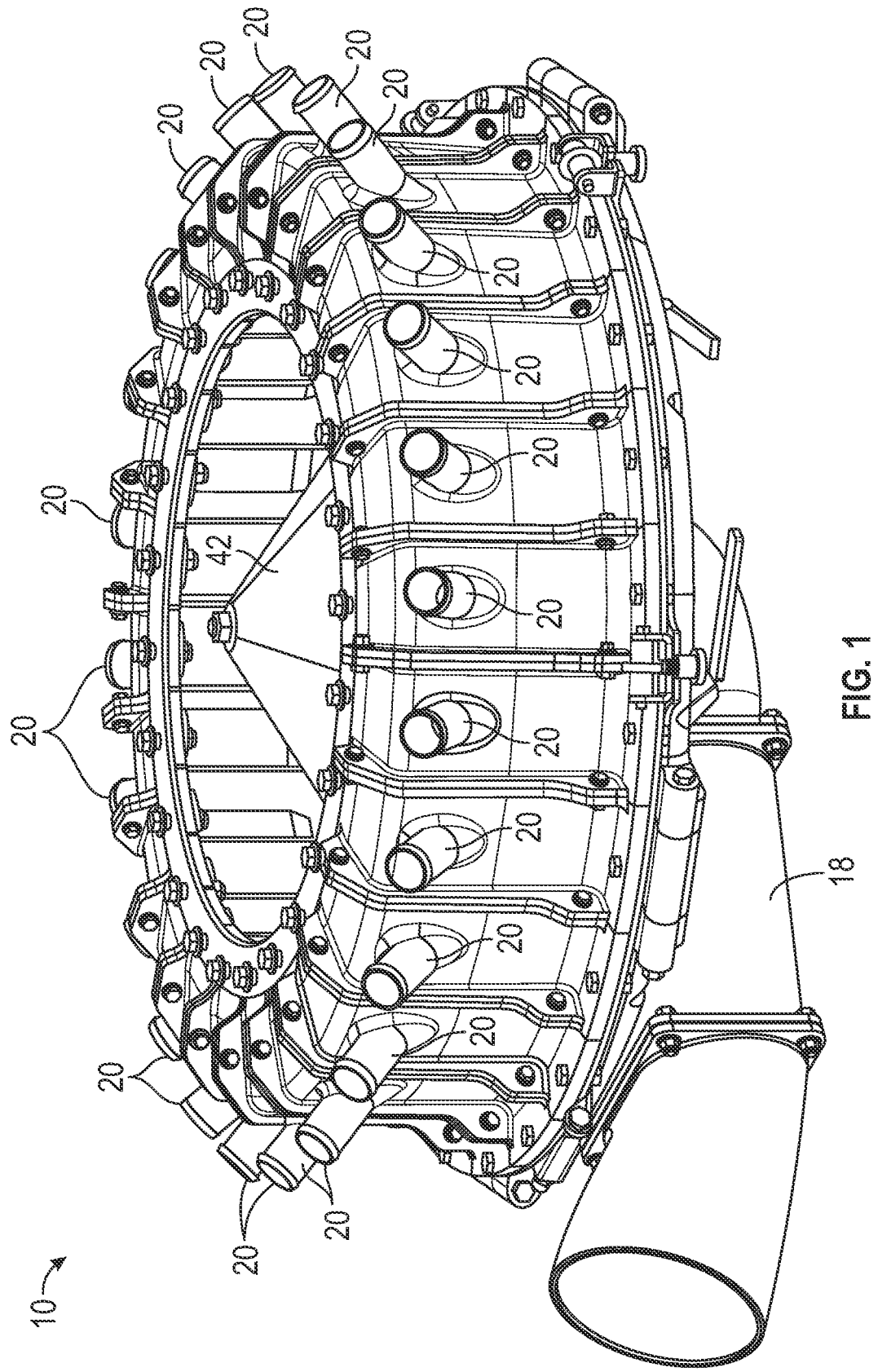
FIG. 1 is a perspective view of the circular bulk seed distributor manifold according to the present invention.
Figure 2:
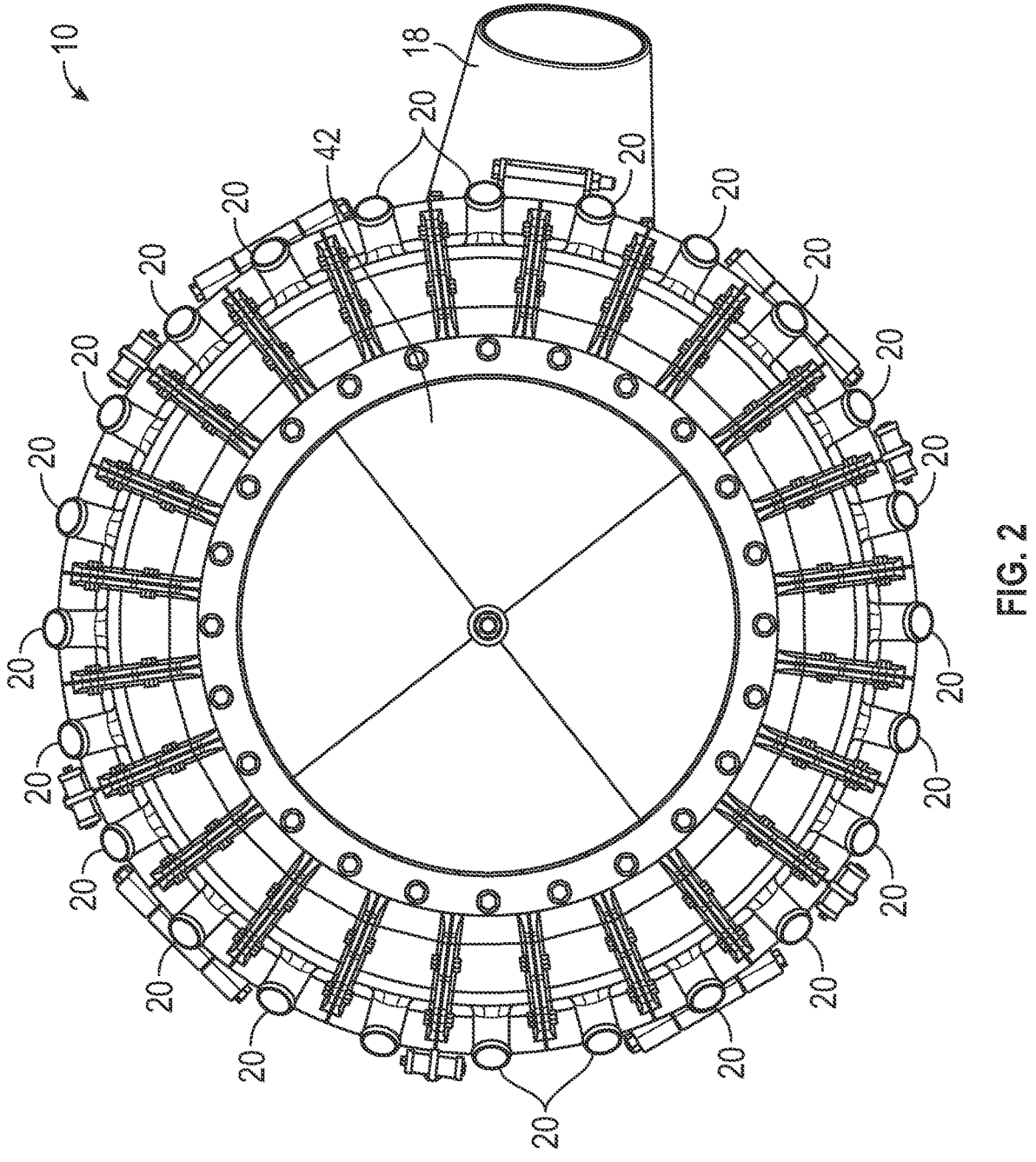
FIG. 2 is a top plan view of the seed distributor manifold as shown in FIG. 1.
Figure 3:
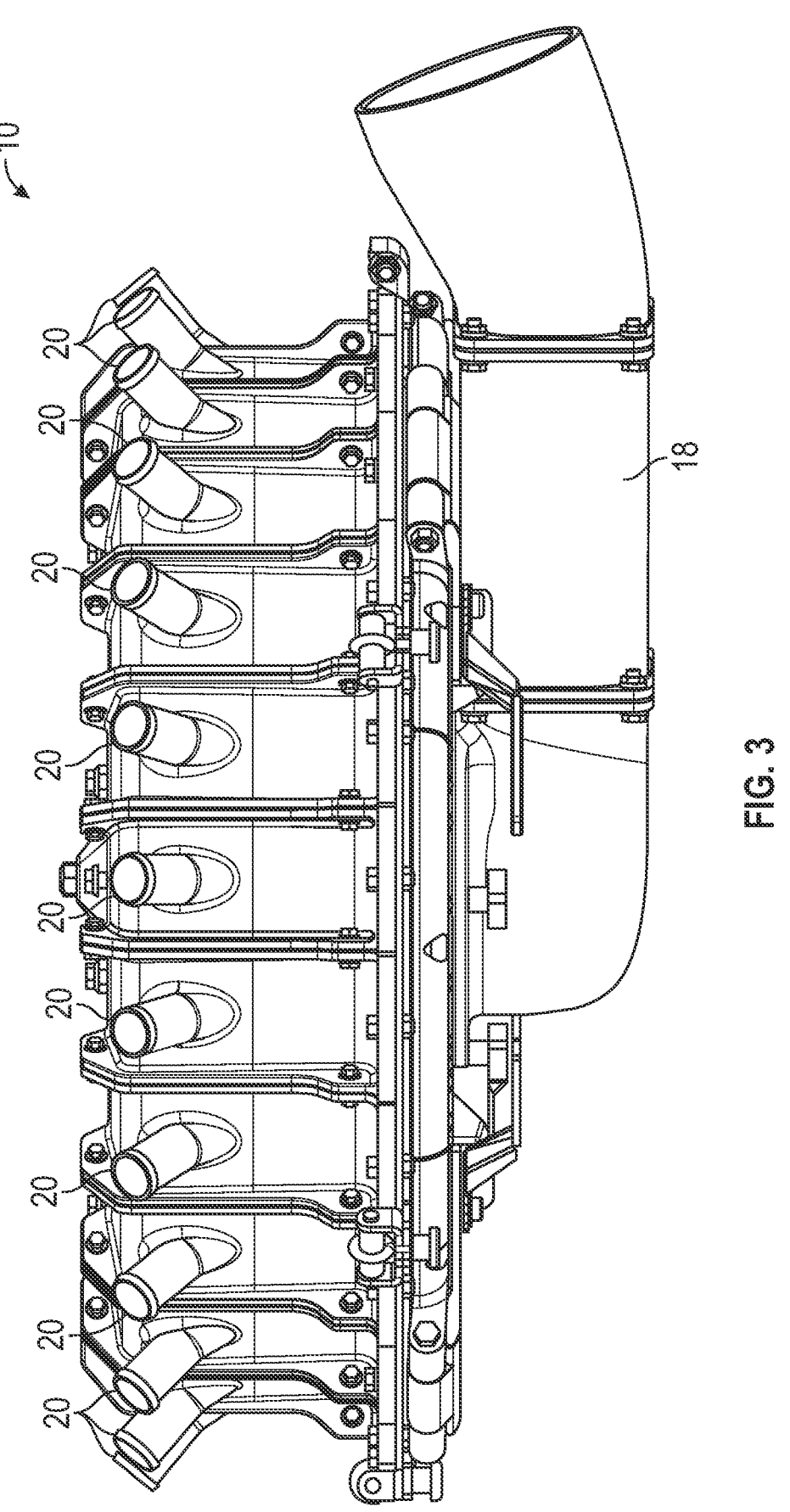
FIG. 3 is a side elevation view of the seed distributor manifold as shown in FIG. 1.

The circular bulk seed distribution manifold 10 of the present invention is used with any conventional seed hopper or tank 12 and conventional row planter units (not shown). The manifold 10 is mounted on the bottom of the hopper funnel 14 to receive seed from the hopper 12. An air inlet 16 is provided in the bottom of the manifold and is connected to a source of pressurized air through a conduit 18. A plurality of tubes or hose barbs 20 extend around the perimeter of the manifold 10. Each barb 20 has a hose (not shown) attached to the outer end of the barb, and the hose extends to a seed bin of one of the row planter units, whereby seed is pneumatically carried from the manifold 10 to the row planter bin for discharge by a seed meter on the row unit.

Figure 7:
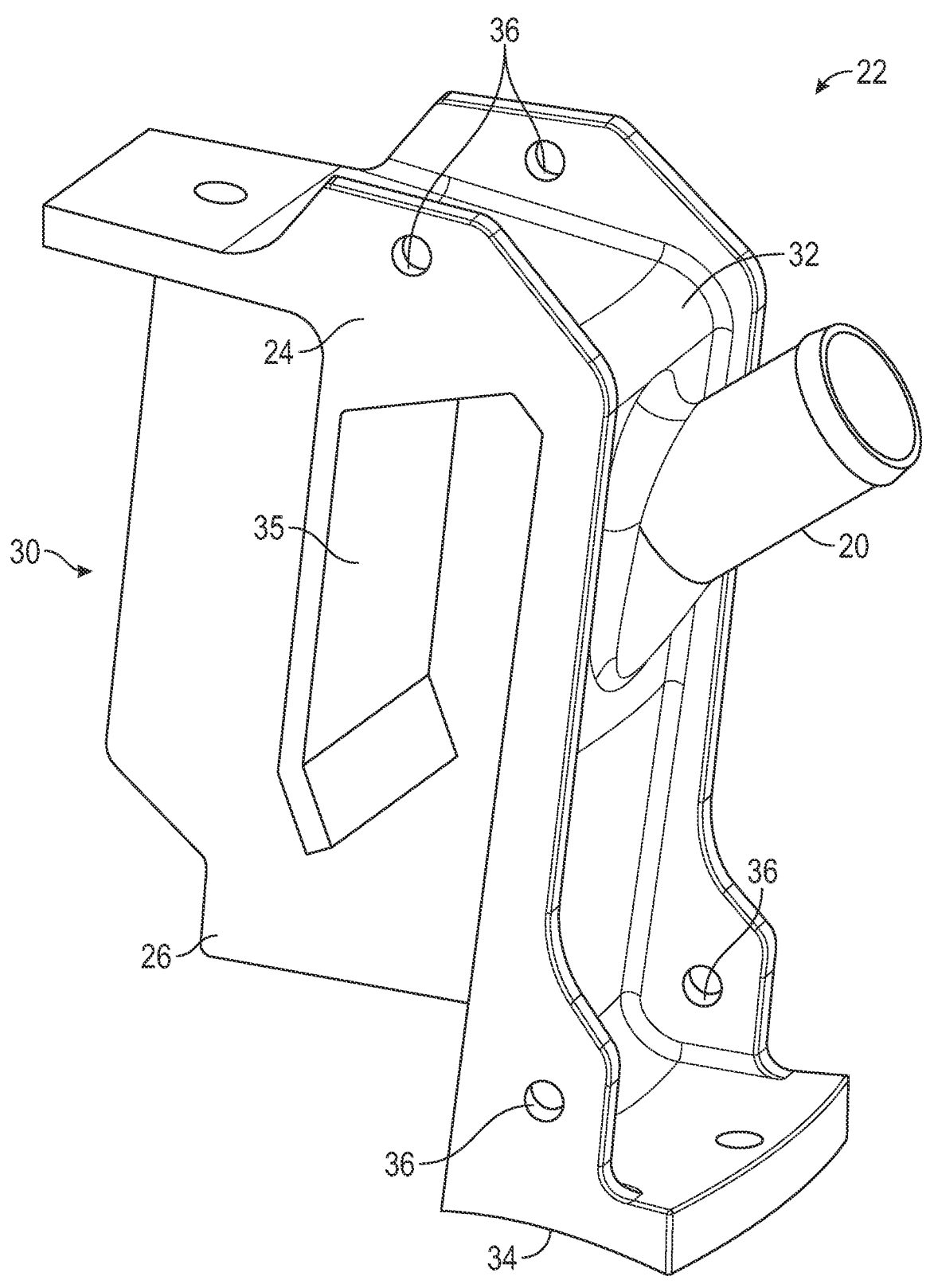
FIG. 7 is another perspective view of the module shown in FIG. 6.
Figure 8:
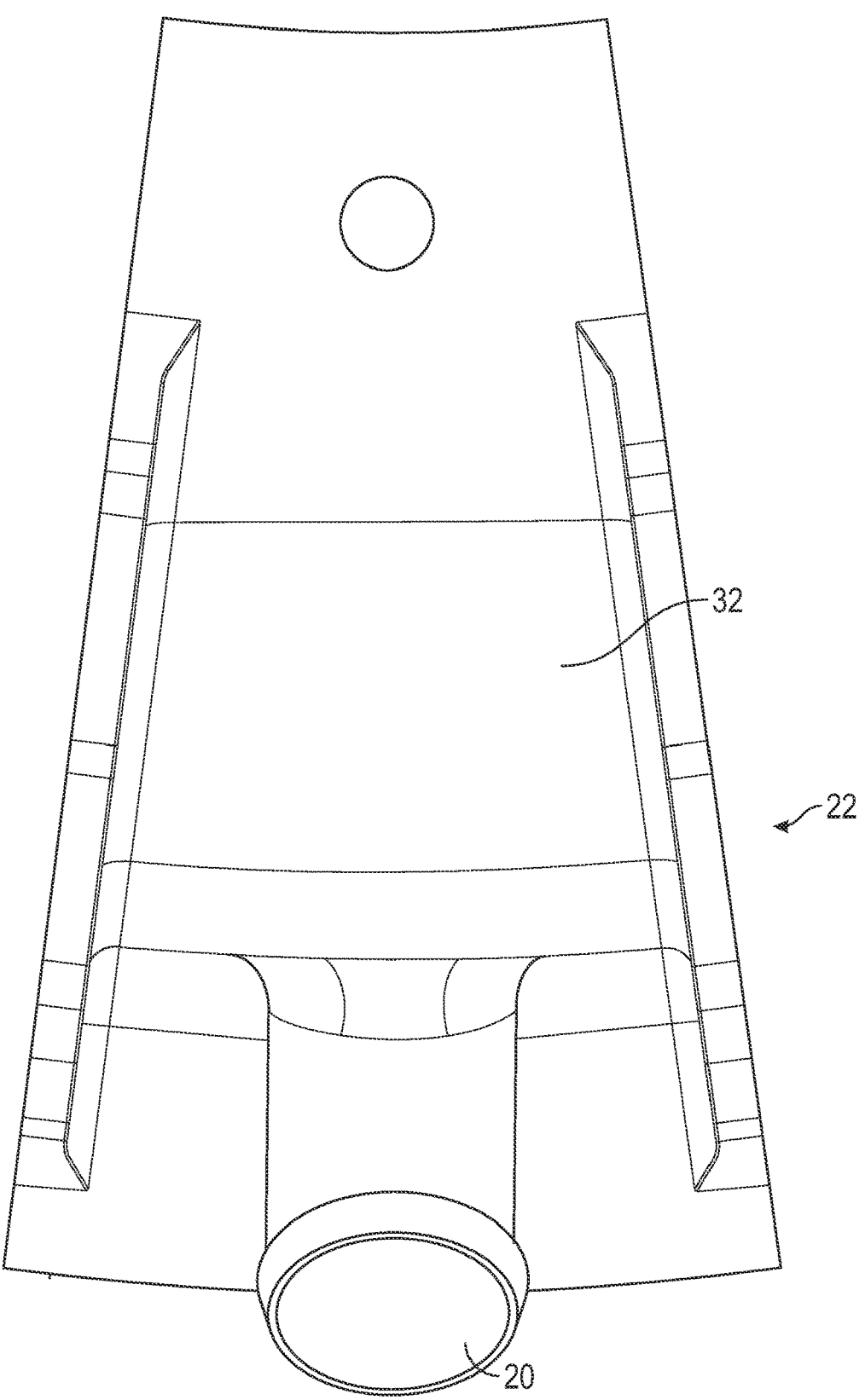
FIG. 8 is a top plan view of the module shown in FIG. 6.
Figure 9:
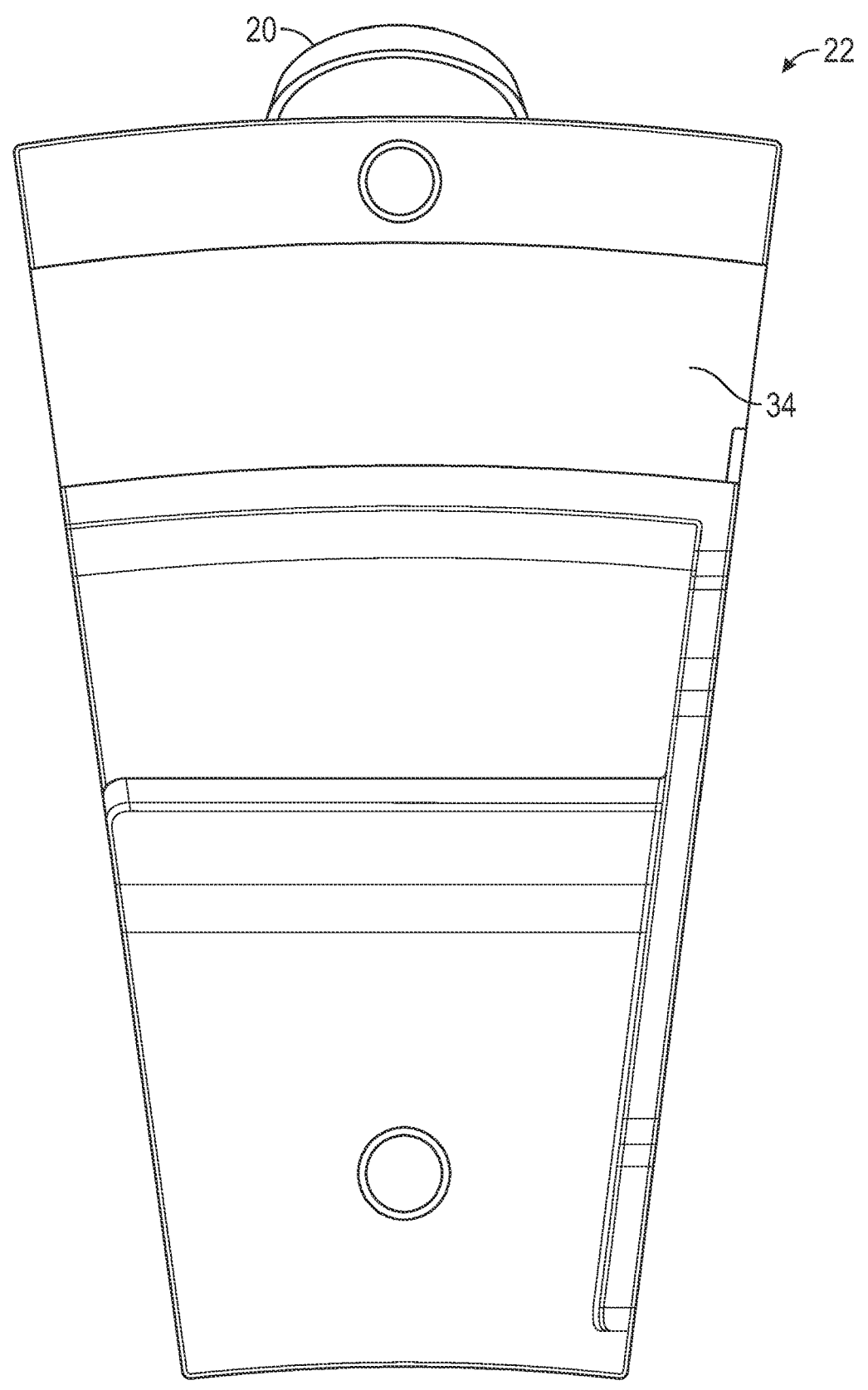
FIG. 9 is a bottom plan view of the module shown in FIG. 6.
Figure 10:
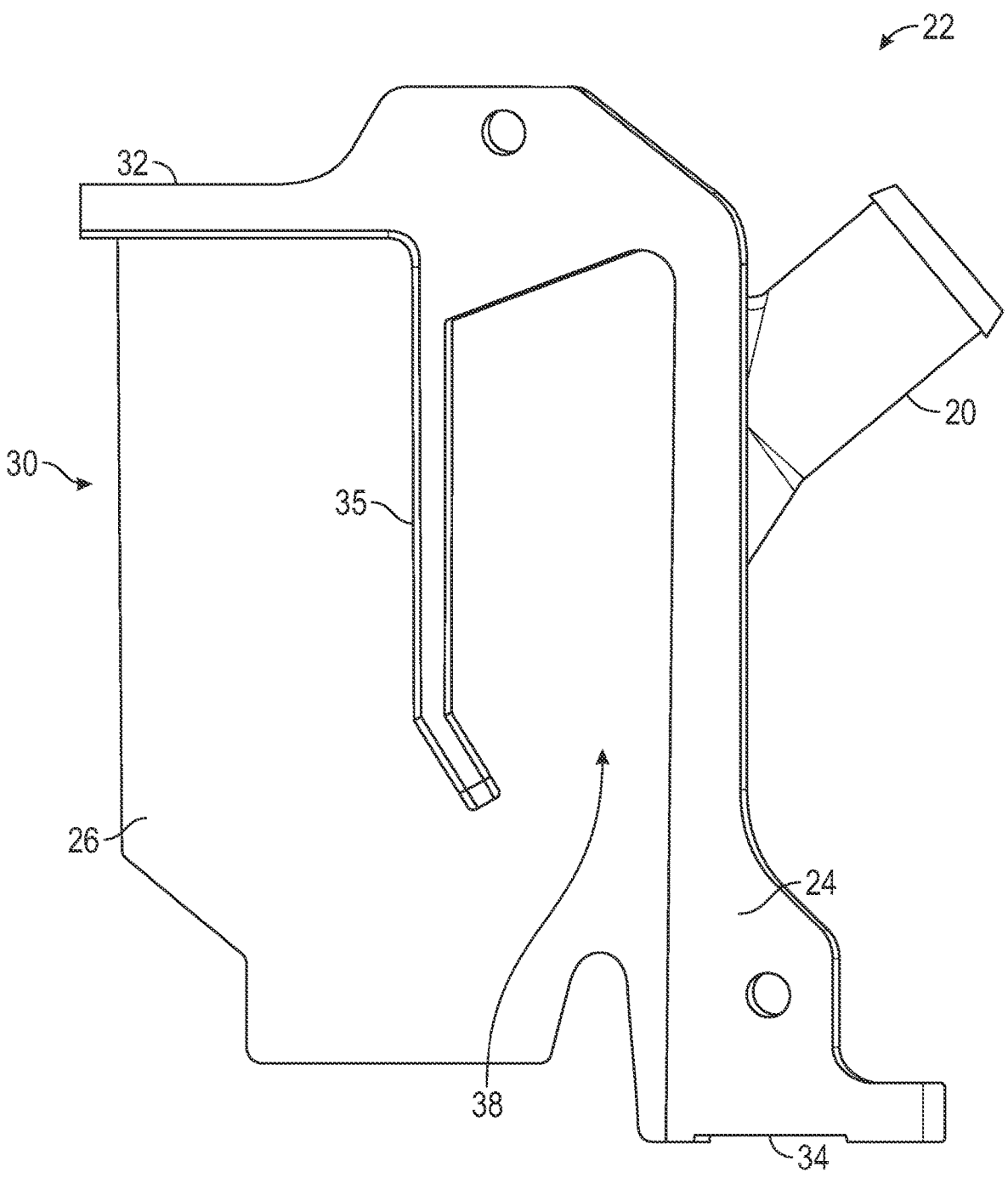
FIG. 10 is a side elevation view of the module shown in FIG. 6.
Figure 11:
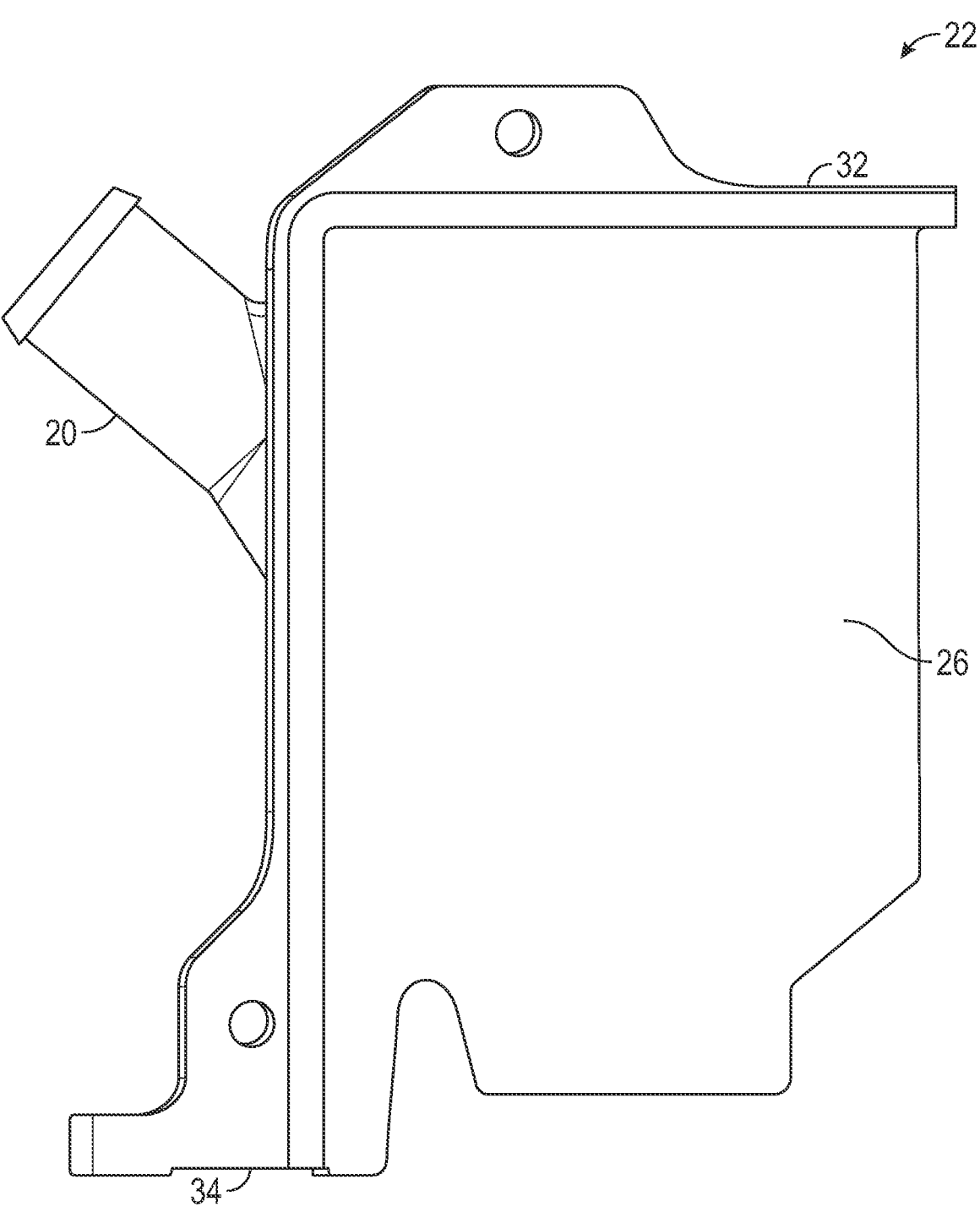
FIG. 11 is a side elevation view of the module from the opposite side of FIG. 10.
Figure 12:
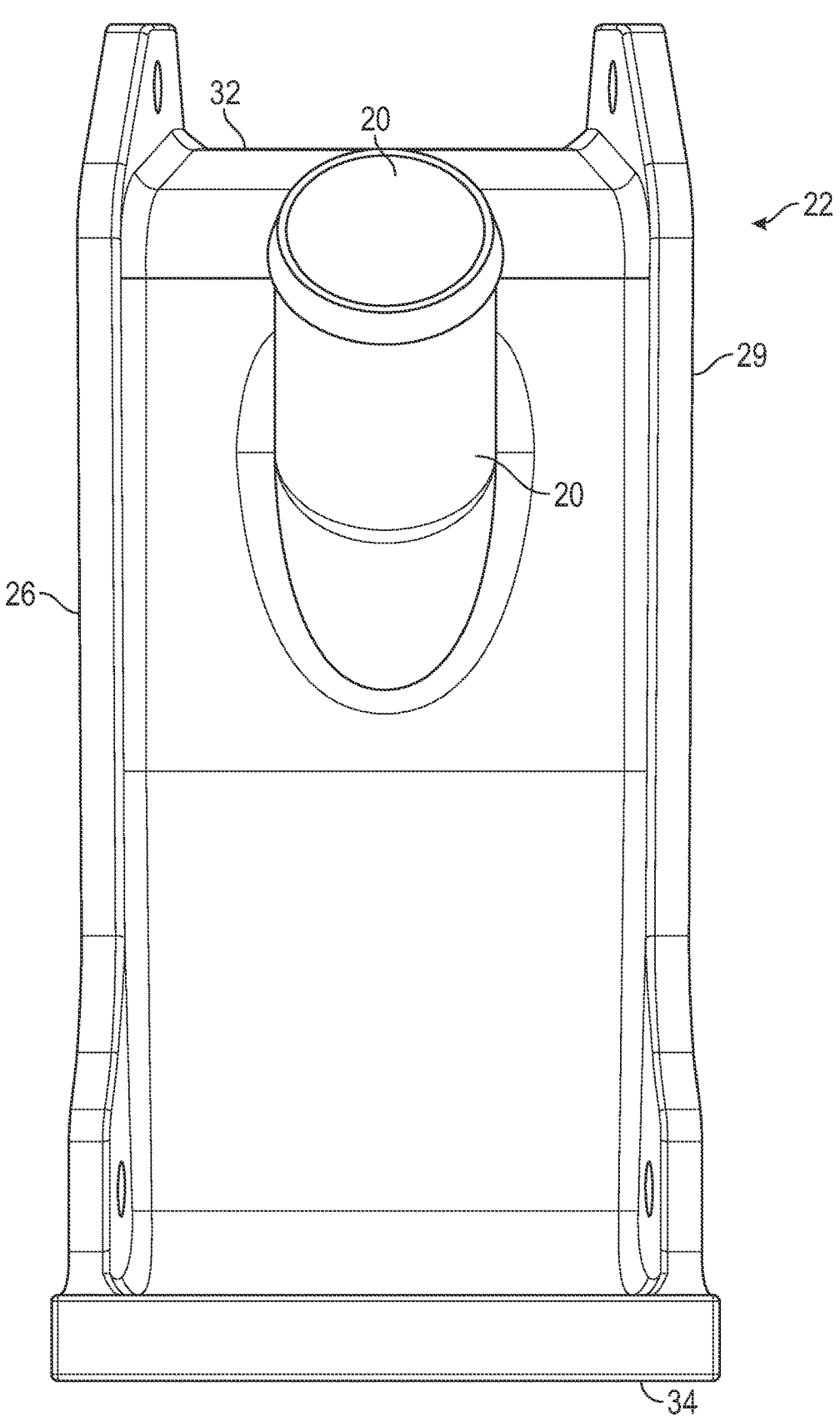
FIG. 12 is a front elevation view of the module shown in FIG. 6.
Figure 13:
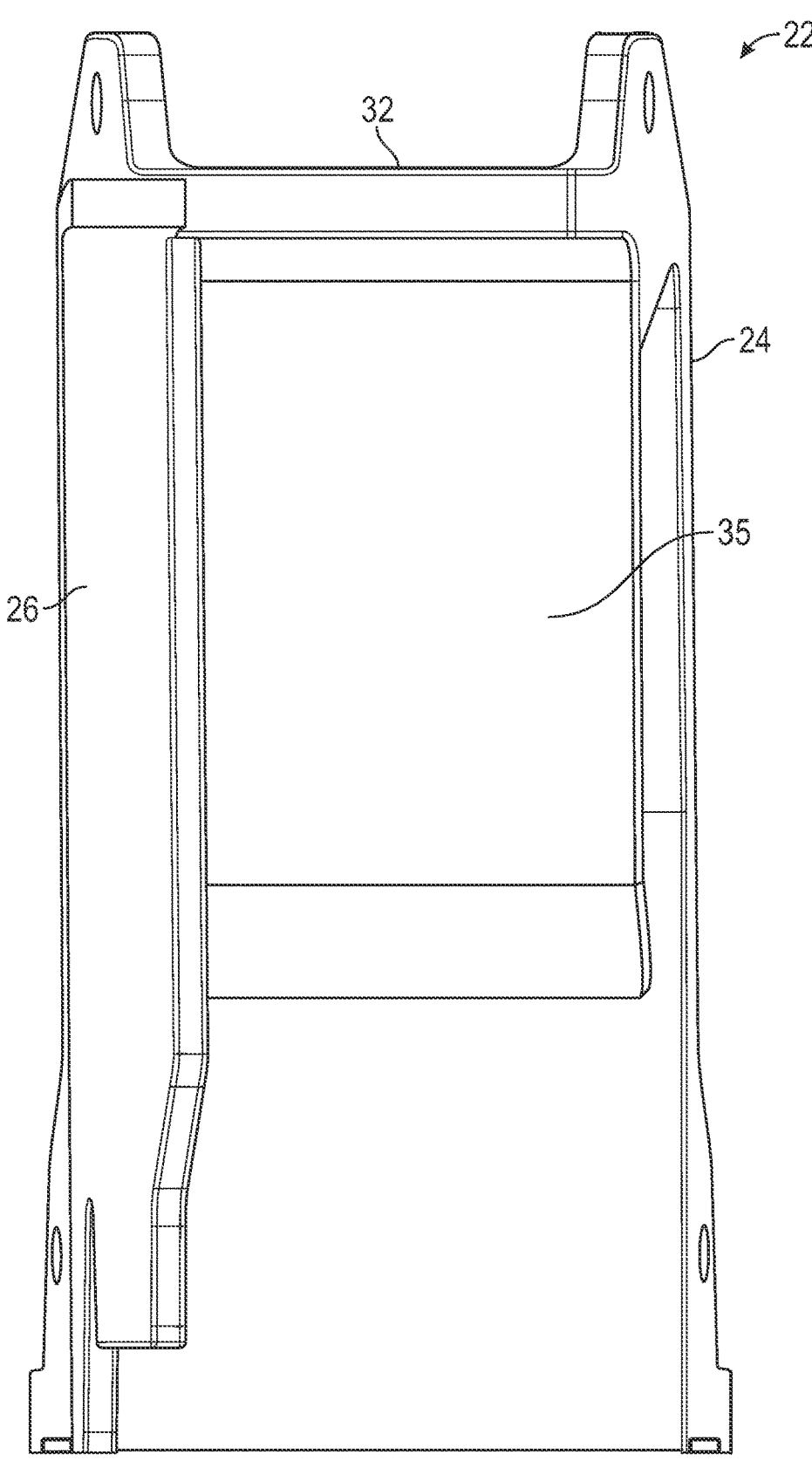
FIG. 13 is a rear elevation view of the module shown in FIG. 6.

The manifold 10 is formed by a plurality of modules 22 connected side to side to form the circular configuration of the manifold 10. Each nozzle 22 is preferably integrally formed with one or more of the tubes or hose barbs 20 extending radially outwardly therefrom. Each module 22 includes a first side wall 24 which is substantially closed, and an opposite side wall 26 which is substantially open, a front or outer wall 28 which extends between the first and second side walls 24, 26, and an open rear portion 30 opposite the front wall 28. The side walls 24, 26 are not parallel to one another. At least one of the sidewalls 24 and/or 26 is angled inwardly toward the opposite side wall, as seen in FIGS. 8, 9, and 13, so that when the modules are assembled, the circular shape of the manifold 10 is formed. Each module 22 also includes a top wall 32 and a bottom wall 34. Each module 22 also includes an internal dividing wall 35 extending downwardly from the top wall 32, as seen in FIGS. 7 and 10. The dividing wall 35 extends substantially across the width of the module 22, as seen in FIG. 13.

The walls 24, 26, 28, 32, 34, and 35 create a cavity 38 for the module. The hose barb 20 extends radially outwardly from the front wall so as to have an inlet 40 formed in the front wall 28. The inlet 40 of each barb 20 is flush with the inside of the front wall 28, and is open to the cavity 38.

Modules 22 are connected in any convenient manner, such as nut and bolt assemblies, in a side-to-side manner, so as to form the circular seed distribution manually manifold

10. For example, as seen in the drawings, the opposite side walls 24, 26 of each module 22 has holes 36 for receiving bolts or other fasteners to secure adjacent modules together.

The front or outer walls 28 of the connected modules 22 form the outer perimeter wall of the manifold 10. The cavities 38 of the assembled modules 22 form an internal circular air chamber within the manifold 10.

Figure 14:
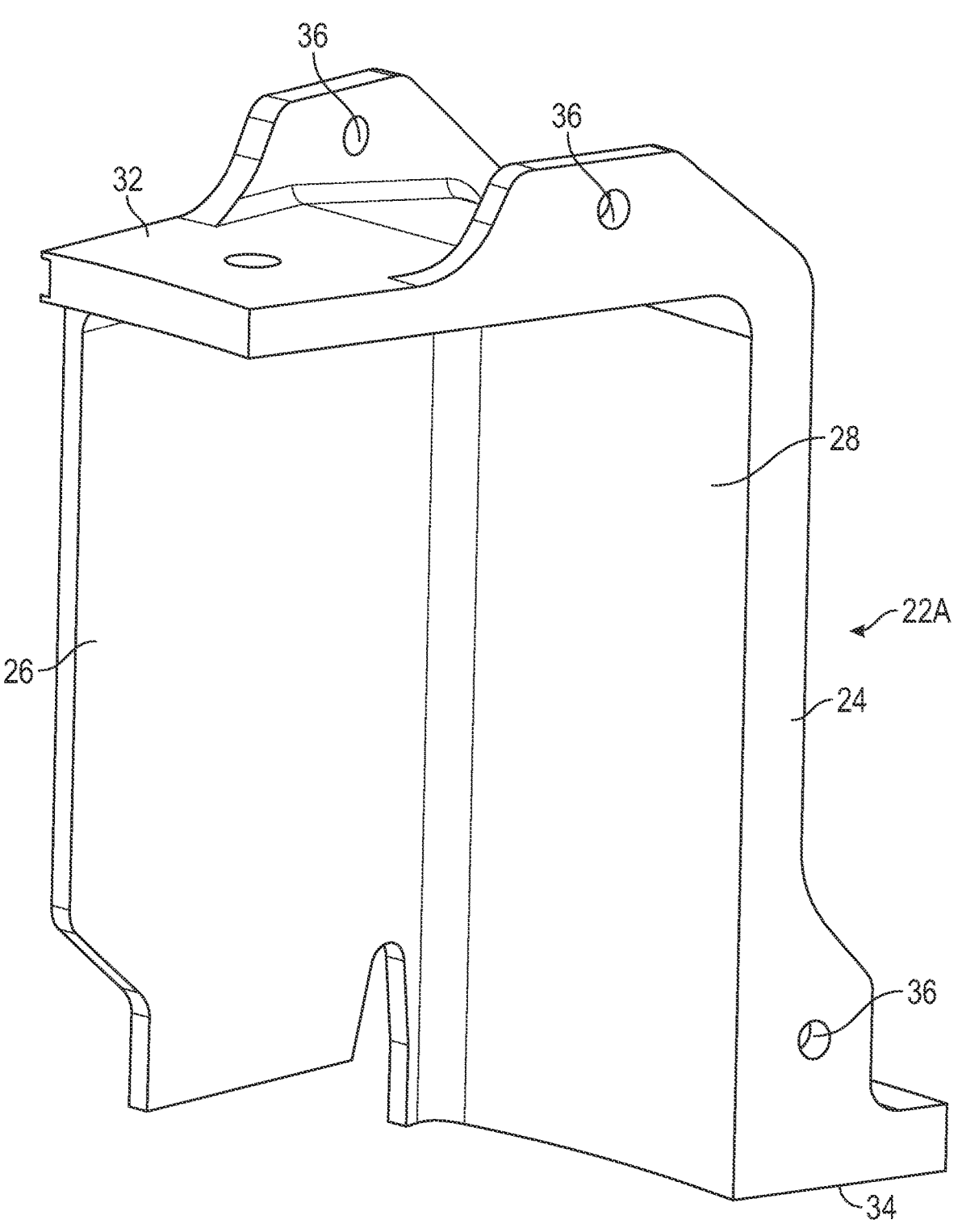
FIG. 14 is a perspective view of an alternative seed tube module blank, without the seed discharge tube.
Figure 15:
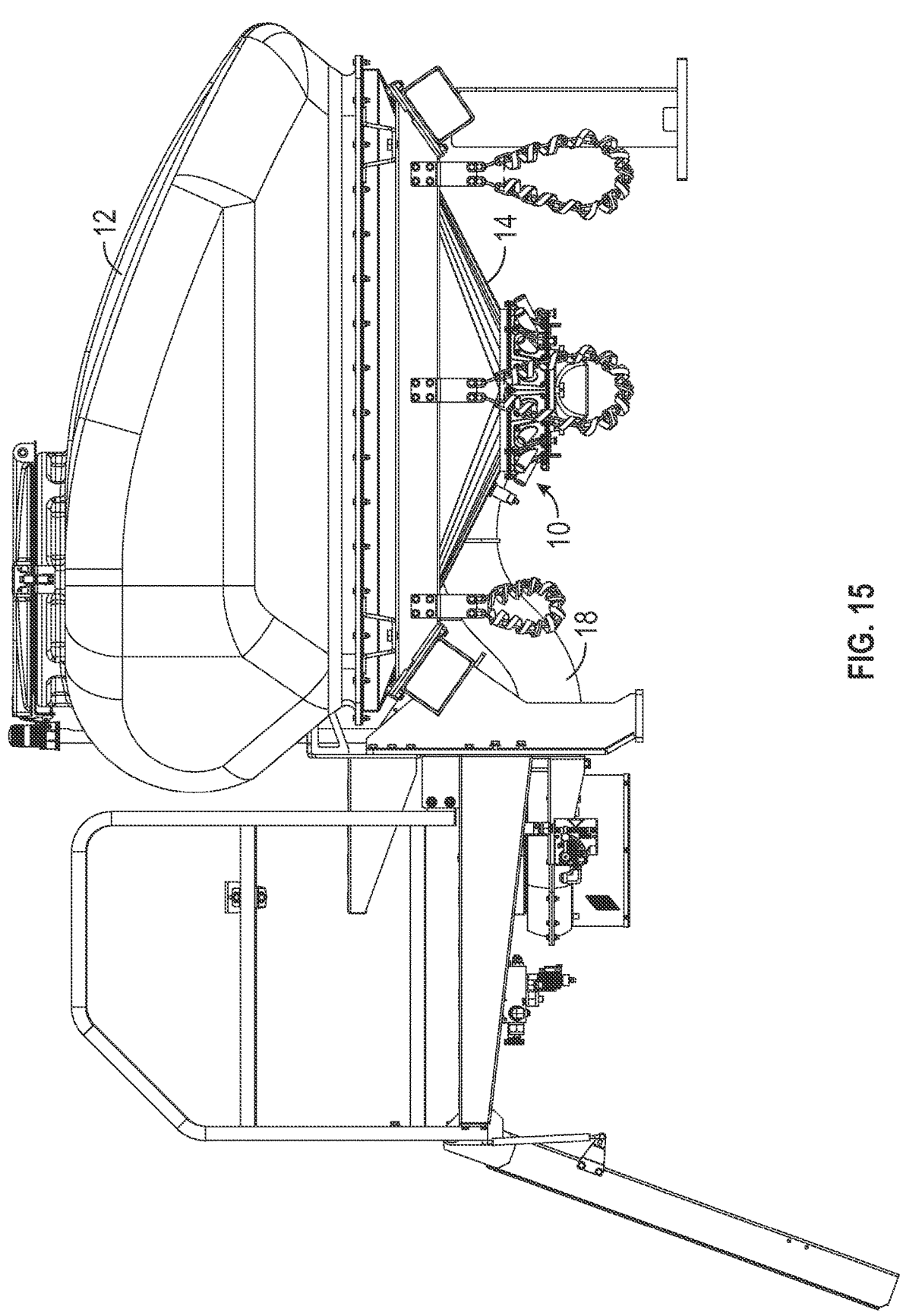
FIG. 15 is a side elevation view of the seed distribution manifold mounted to a funnel of a bulk seed tank, according to the present invention.
Figure 16:
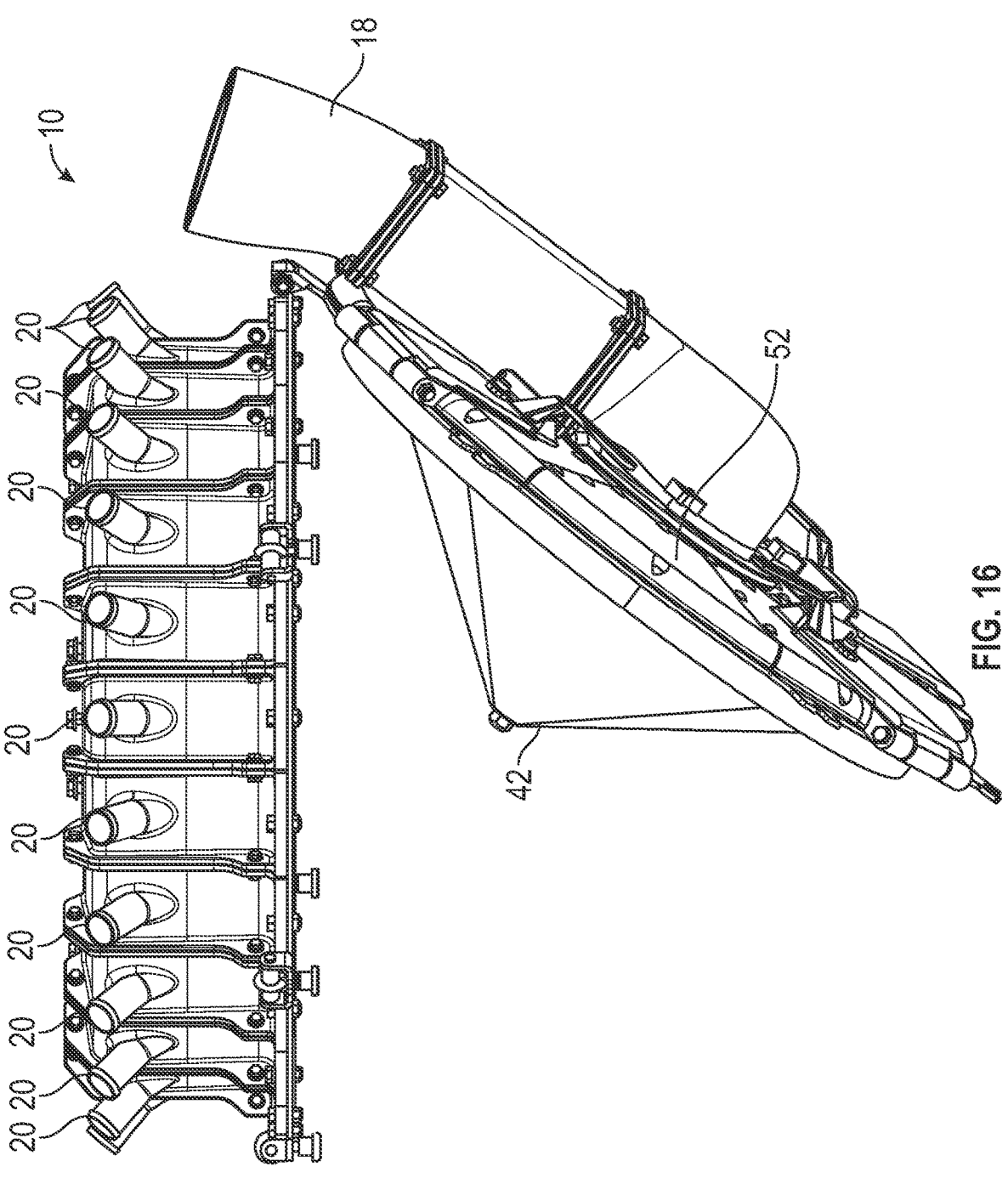
FIG. 16 is a view showing the floor of the manifold in an open position for clean out of the manifold chamber.

The diameter of the manifold 10 can be increased or decreased by adding or decreasing the number of modules 22 assembled together. Preferably, the manifold 10 has the same number of tubes or hose barbs 20 as the number of row unit planters being utilized. For example, manifold 10 shown in FIG. 1 has 24 modules each having a single hose barb 20, for use with a 24-row planter. The modules 22 shown in the drawings each extend 15 radial degrees, to form the 360-degree manifold 10. In an alternative embodiment, a single module 22 may include two or more hole barbs 20. As another alternative example, 12 modules can be assembled, with the module width increased to 30 radial degrees, and with each module having 2 barbs 20, such that the manifold still has a total of 24 barbs for use with a 24-row planter. As a further alternative, if fewer hose barbs are needed for a narrower planter, such as a 12-row planter, blank modules 22A (FIG. 14), which does not have a hose barb 20, can be substituted for some of the modules 22. As another alternative to the module blank 22A, some of the tubes 20 can be plugged for use of the manifold 10 on a narrower row planter having fewer planter units.

If one of the modules 22 becomes damaged, for example the hose barb 20 gets broken off, the broken module can be quickly and easily detached from the adjacent modules, and a new module substituted for the broken module.

Figure 5:
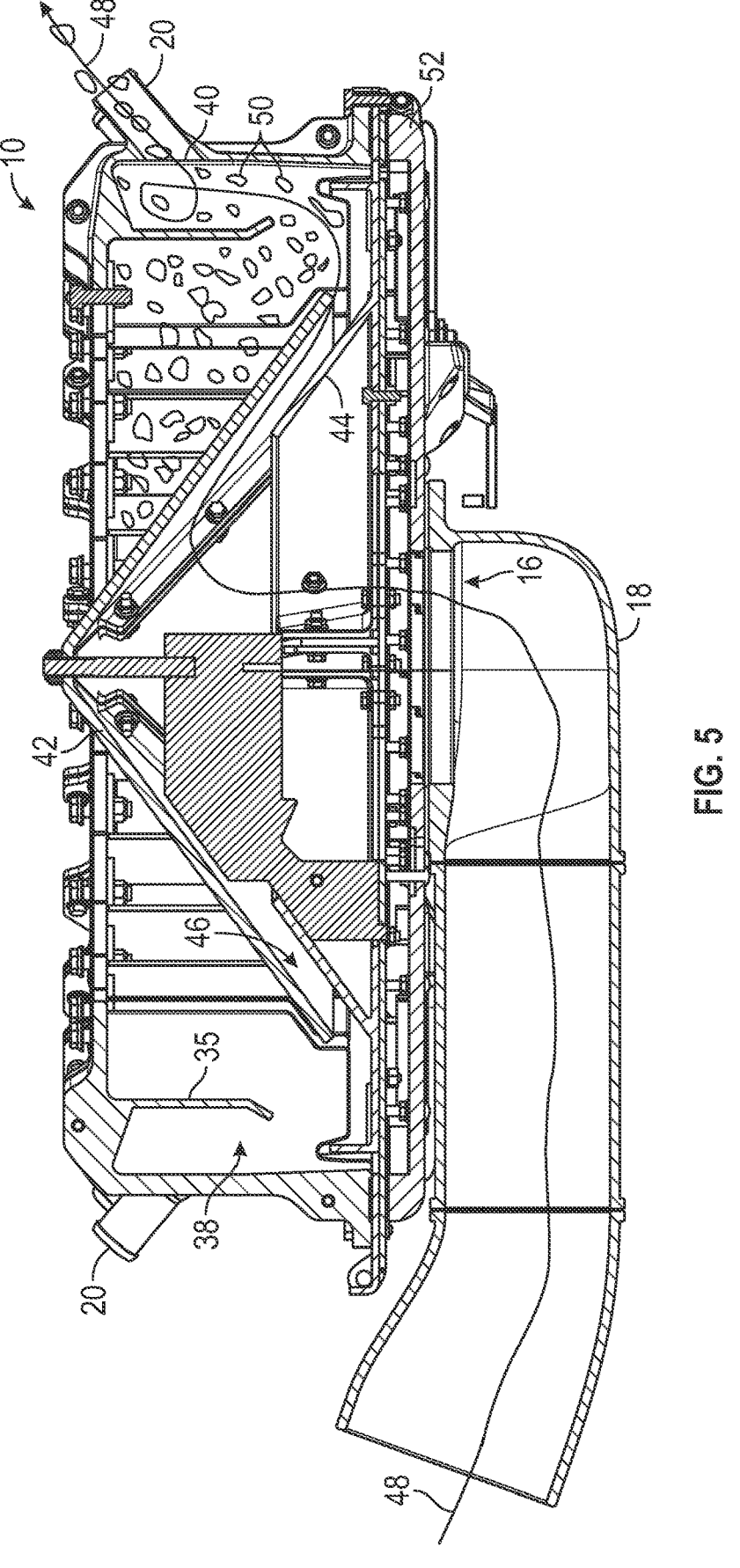
FIG. 5 is a sectional view of the manifold, with an arrow line added to illustrate airflow through the manifold during operation.
Figure 6:
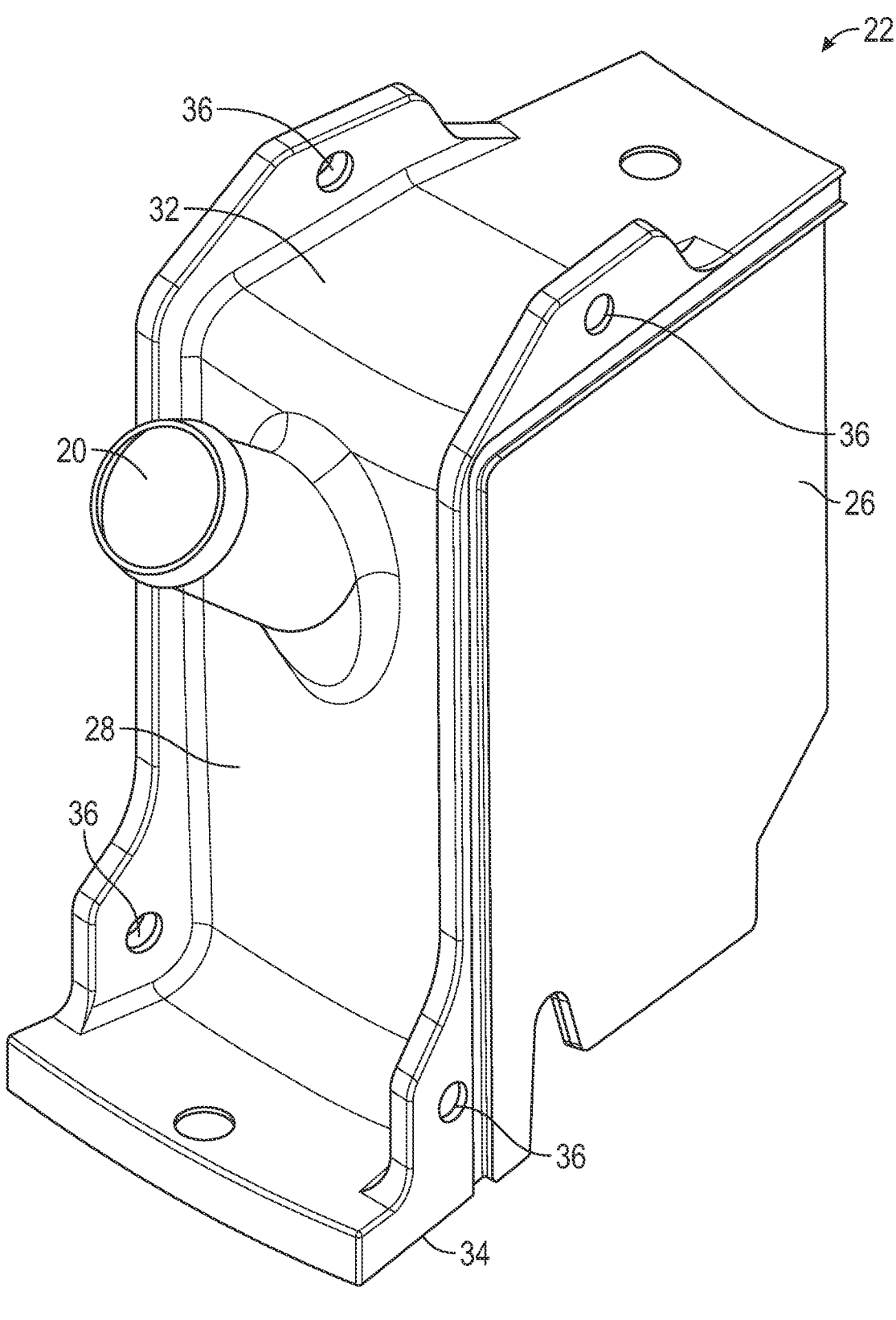
FIG. 6 is a perspective view of one of the seed tube modules which comprise a portion or segment of the seed distribution manifold shown in FIG. 1.

The manifold 10 includes an internal cone assembly to direct air and seeds to the module cavities 38 and hose barbs 20. As seen in FIG. 5, the cone assembly includes an upper cone 42 and a truncated lower cone 44 positioned concentrically beneath the upper cone 42. The upper and lower cones 42, 44 are spaced apart so as to create an annular or circular air flow space 46 between the cones 42, 44. Thus, pressurized air can be directed through the conduit 18 and upwardly through the air inlet 16 into the air space 46, then into the cavities 38 of the modules 22 and then out the hose barbs 20, as indicated by the arrow 48 in FIG. 5. Seed from the tank 12 enters the manifold 10 through funnel 14, and is directed by the upper cone 42 to the cavities 38 wherein the seeds 50 picked up by the pressurized air to form a turbulent or fluidized bed mixture of air and seed distributed evenly around the circular chamber of the manifold 10. The seeds 50 are carried outwardly through the hose barbs 20 and the connected hoses (not shown) to the bins of the row planter units. The second cone 44 beneath the first cone 42 also prevents migration of seed toward the air inlet 16.

The tube or hose barb 20 does not extend into the cavity 38 of the module 22. With the inlet 40 of each tube or hose barb 20 being flush or coextensive with the inside of the outer module wall 28, plugging or blockage of the inlet 40 is minimized or eliminated.

Figure 4:
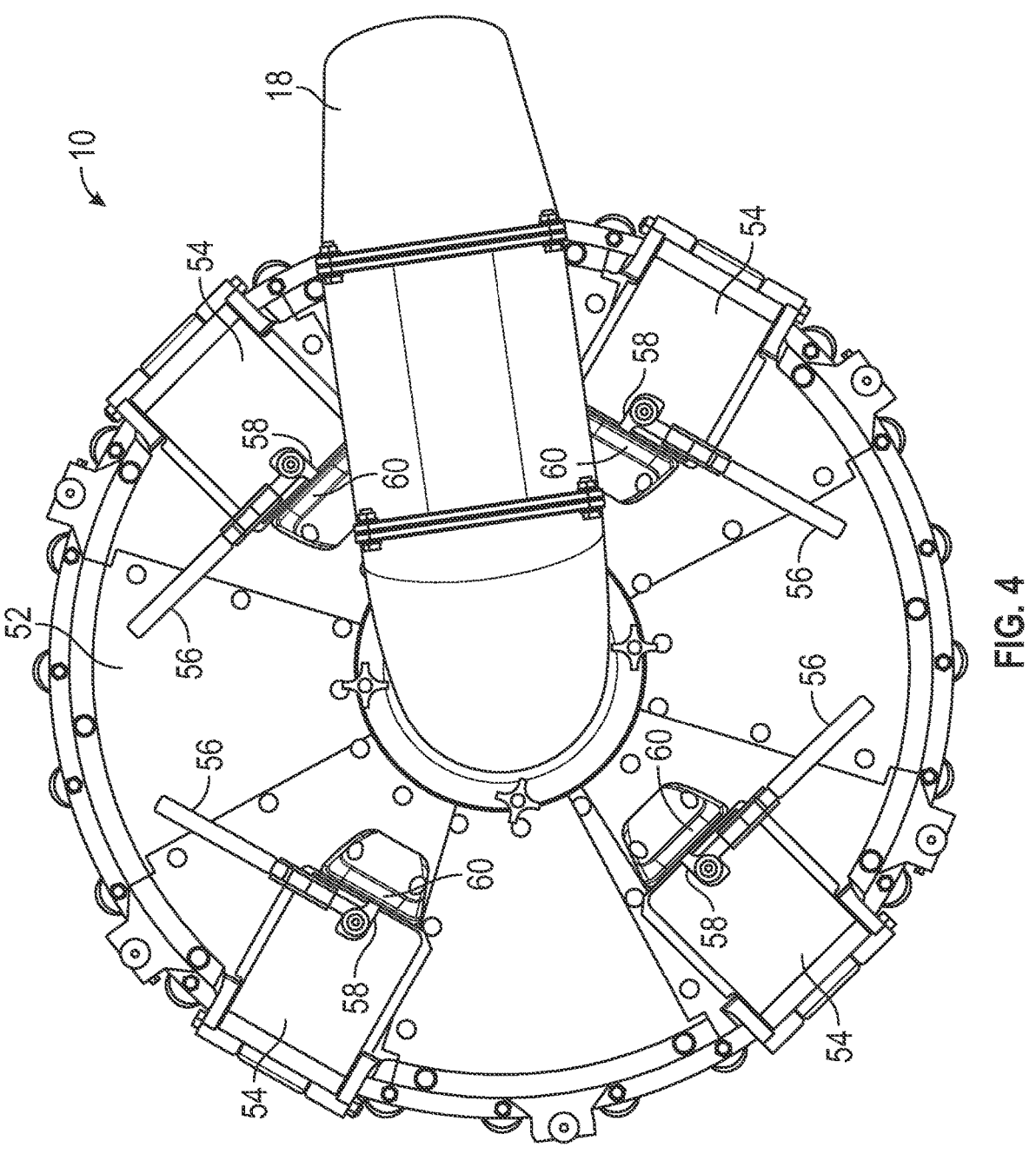
FIG. 4 is a bottom plan view of the sea distributor manifold as shown in FIG. 1.

The manifold 10 includes a floor 52 which is pivotally mounted so as to be movable between a closed position when the manifold is in use and an open position for inspection or cleanout. The air conduit 18 is connected to the floor 52, which has a central opening for receiving air from the conduit 18. The floor 52 may also include one or more doors 54 (FIG. 4), which can be moved between open and closed positions. The doors 54 may be mounted in any convenient manner. As seen in FIG. 4, the doors include a rotatable handle 56 with a tab 58, which is captured by a lip 62 retaining the door 54 in a closed position. The handle 56 can be rotated to release the tab 58 from the lip 60, thereby allowing the door 54 to open.

The circular bulk seed distribution manifold eliminates uneven distribution of seed adjacent the inlets of the tubes 20, as in conventional bulk seed distributors. The flush inlet of the tube or barb 20 reduces plugging of the inlets during operation. The floor 52 and doors 54 allow for quick and easy section and cleanout of the manifold 10.

The scope of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A seed distribution manifold for delivering seed from a bulk seed tank via hoses to bins on row planter units, comprising:
   a plurality of modules, each having opposite first and second lateral sides and an outer wall extending between the opposite sides;
   the modules being connected side to side by fasteners to form a circular chamber adapted to receive seed from the bulk seed tank;
   a floor assembly connected to the circular chamber;
   at least some of the modules having one or more tubes extending radially outwardly from the outer wall, and each tube being connected to one of the hoses; and
   an air inlet to direct pressurized air into the circular chamber to direct seeds in the chamber outwardly through the seed tubes and hoses to the bins.

2. The seed distribution manifold of claim 1 wherein the first lateral side of each module is closed and the second lateral side of each chamber is open.

3. The seed distribution manifold of claim 1 wherein each module has a substantially open inner side opposite the outer wall.

4. The seed distribution manifold of claim 1 wherein the diameter of the circular chamber is increased by adding more of the modules and decreased by deleting some of the modules.

5. The seed distribution manifold of claim 1 wherein some of the modules may be blanks without tubes.

6. The seed distribution manifold of claim 1 wherein each module has a cavity for collecting seeds before conveyance out the seed tube.

7. The seed distribution manifold of claim 1 wherein each seed tube has an inlet which is coextensive with the outer wall.

8. The seed distribution manifold of claim 1 wherein the floor assembly includes a first cone with an upper surface to distribute seed 360 degrees toward the seed tube inlets.

9. The seed distribution manifold of claim 8 wherein the first cone has a lower surface to direct the pressurized air 360 degrees toward the seed tube inlets.

10. The seed distribution manifold of claim 8 further comprising an air inlet beneath the first cone to direct the pressurized air to the seed tubes.

11. The seed distribution manifold of claim 10 further comprising a second cone spaced apart from the first cones to define an air flow path therebetween.

12. The seed distribution manifold of claim 8 further comprising a smaller cone beneath the first cone to prevent migration of seed toward the air inlet.

13. The seed distribution manifold of claim 1 wherein the floor assembly is pivotally attached to the circular chamber for movement between a closed position for seed delivery and an open position for cleaning the circular chamber.

14. The seed distribution manifold of claim 1 wherein the air inlet is in the floor assembly.

15. A seed distribution manifold for delivering seed from a bulk seed tank via hoses to bins on row planter units, comprising:
   a circular chamber adapted to receive seed from the bulk seed tank;
   the circular chamber having a perimeter wall and a floor;
   a pressurized air inlet in the floor;
   a plurality of seed tubes extending outwardly from the perimeter wall of the circular chamber and each seed tube being adapted for connection to one of the hoses; and
   the perimeter wall of the circular chamber being formed from a plurality of modules joined together side by side with fasteners so as to extend continuously 360 degrees.

16. The seed distribution manifold of claim 15 wherein the modules and the tubes are integrally formed.

17. The seed distribution manifold of claim 16 wherein each module has an outer perimeter wall, opposite side walls, and a substantially open inner perimeter.

18. The seed distribution manifold of claim 17 wherein the outer perimeter wall has an opening defining a seed inlet end of the tube.

19. The seed distribution manifold of claim 15 further comprising a double cone assembly to direct seed and pressurized air towards the seed tubes.

20. The seed distribution manifold of claim 15 wherein each tube is connected to only one of the row planter units.

21. The seed distribution manifold of claim 1 wherein each tube has a seed inlet residing in a vertical plane.

22. The seed distribution manifold of claim 1 wherein each tube has a seed inlet spaced above the floor assembly.

23. The seed distribution manifold of claim 1 wherein each tube has an inlet in an upper portion of the module.

24. The seed distribution manifold of claim 1 wherein each of the modules includes an inner wall spaced from the outer wall to define a cavity.

25. The seed distribution manifold of claim 6 wherein the cavities extend around an outer portion of the chamber.

26. The seed distribution manifold of claim 1 wherein the fasteners extend through mating holes in adjacent modules.

27. The seed distribution manifold of claim 15 wherein the modules have holes for receipt of the fasteners.

\* \* \* \* \*